No. 795,956. PATENTED AUG. 1, 1905.
E. A. BYRNES.
PROCESS OF ELECTRICALLY HEATING WATER AND OTHER LIQUIDS.
APPLICATION FILED DEC. 10, 1904.

Witnesses:
R. A. Balderson
J. B. Hill

Inventor
Eugene A. Byrnes
by Byrnes & Townsend,
Att'ys.

UNITED STATES PATENT OFFICE.

EUGENE A. BYRNES, OF WASHINGTON, DISTRICT OF COLUMBIA.

PROCESS OF ELECTRICALLY HEATING WATER AND OTHER LIQUIDS.

No. 795,956. Specification of Letters Patent. Patented Aug. 1, 1905.

Application filed December 10, 1904. Serial No. 236,361.

*To all whom it may concern:*

Be it known that I, EUGENE A. BYRNES, a citizen of the United States, residing at Washington, in the District of Columbia, have invented certain new and useful Improvements in Processes of Electrically Heating Water and other Liquids, of which the following is a specification.

According to this process, water and other liquids are heated by electrically heating a porous or granular resistance-conductor and passing the liquid into or through the heated conductor, thus exposing a large heated surface to the liquid in the interstices of the conductor.

For the purpose of illustration two forms of apparatus for carrying out the process are shown in the accompanying drawings, in which—

Figure 1:
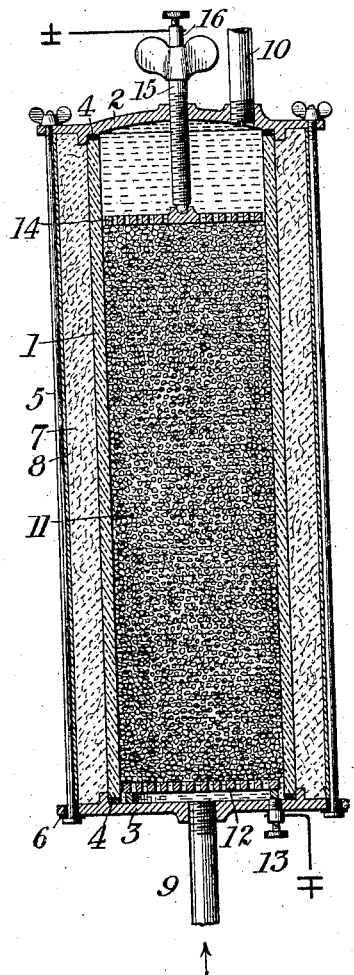
Figure 2:
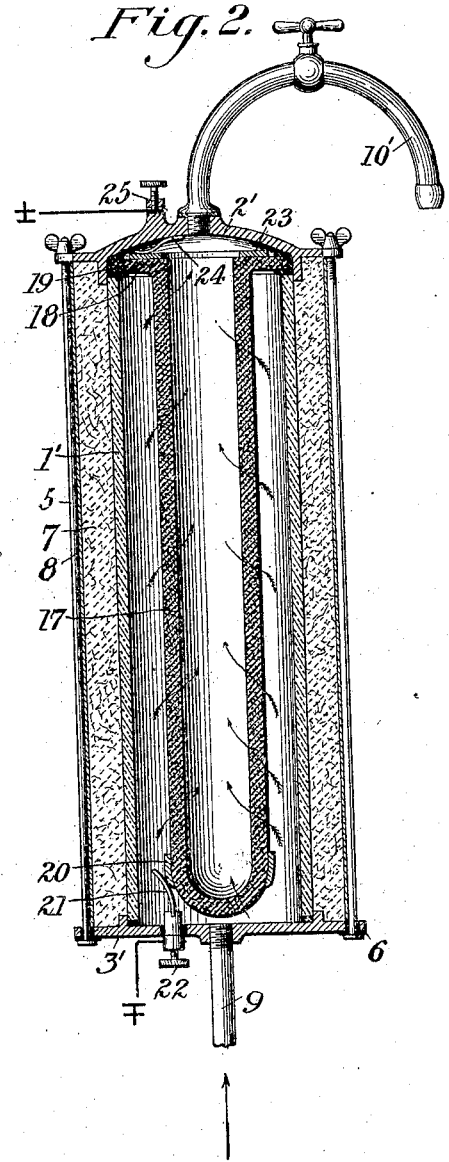

Figure 1 is an axial section of a heater employing a granular resistance-conductor, and Fig. 2 is an axial section of a heater employing a tubular resistance-conductor.

The heater shown in Fig. 1 comprises a tubular body 1, which may be of electrically-non-conductive material, such as glass or porcelain or of enameled iron. The ends of the body are closed by metal covers 2 3, rubber washers 4 being interposed. The covers are forced against the washers by long bolts which pass through marginal openings in the covers. An insulating-bushing 6 surrounds one end of each bolt. A layer 7 of a heat-insulating material surrounds the body 1 and is inclosed in a thin metal casing 8. A water-supply pipe 9 enters the lower head 3, and an outlet-pipe 10 leads from the upper head 2. Within the body 1 is a granular mass 11 of electrically-conductive material—such as broken carbon or a mixture of graphite, carborundum, and silica—constituting a resistance-conductor. This mass is supported on a perforated metal terminal plate 12, having a binding-post 13, and supports a second perforated metal terminal plate 14. A metal thumb-screw 15, carrying a binding-post 16, is threaded through the upper cover 2 and bears on the plate 14, so that the granular mass 11 may be compressed to give it the desired electrical resistance.

In using the described heater an electric current is passed through the granular resistance-conductor, and the water or other liquid to be heated is introduced through the pipe 12, thence entering the interstices of the conductor, whereby it is quickly raised to any desired temperature. The water may be heated while at rest or in motion, a continuous current of water being preferably passed through the apparatus and out of the pipe 10.

The apparatus shown in Fig. 2 comprises a tubular body 1', preferably of electrically-non-conductive material, closed at the ends by metal heads 2' 3'. The heads are secured in place by bolts 5, insulated by bushings 6. The body is surrounded by heat insulation 7 in a metal casing 8. A supply-pipe 9' enters the lower head, and a discharge-pipe 10' leads from the upper head. Axially arranged within the body 1' is a porous tubular resistance-conductor 17, which may consist of a molded and baked mixture of graphite, silica, and a binder. This conductor is closed at its lower end and has a marginal horizontal flange 18 at its upper end. This flange is surrounded by a rubber packing-ring 19 and is clamped between the upper head 2' and the body 1'. Surrounding the lower end of the conductor 17 is a metal ring-terminal 20, which bears against a spring-contact 21, carried by a binding-post 22, passing through the lower head. A second metal ring-terminal 23 is secured to the upper end of the conductor 17 and bears against a spring-contact 24, carried by the metal cover 2', which in turn has a binding-post 25.

In using the second type of heater the tubular resistance-conductor is electrically heated and water is introduced through the pipe 9' and gradually forced through the heated conductor and out of the pipe 10', a continuous heating thus being effected.

The granular or porous resistance-conductors are or may be effective not only to heat and sterilize but also to filter the water. A similar heater may also be used to generate steam. If the liquid to be heated is a conductor of electricity, the conductivity of the resistance-conductor may be correspondingly decreased.

It will be understood that the resistance-conductors may be electrically heated either before or after the liquid has been introduced into their interstices. It is preferred to simultaneously pass currents of electricity and the liquid to be heated through these conductors.

I claim—

1. The process of heating liquids, which consists in electrically heating a porous or granular resistance-conductor, and introducing the liquid into the interstices of said conductor, as set forth.

2. The process of heating liquids, which consists in electrically heating a porous or granular resistance-conductor, and passing the liquid through the interstices of said conductor, as set forth.

In testimony whereof I affix my signature in presence of two witnesses.

EUGENE A. BYRNES.

Witnesses:
CLINTON P. TOWNSEND,
JULIA B. HILL.